July 17, 1951 W. P. SCHMITTER 2,560,990
POWER TRANSMISSION
Filed Sept. 28, 1946 2 Sheets-Sheet 1
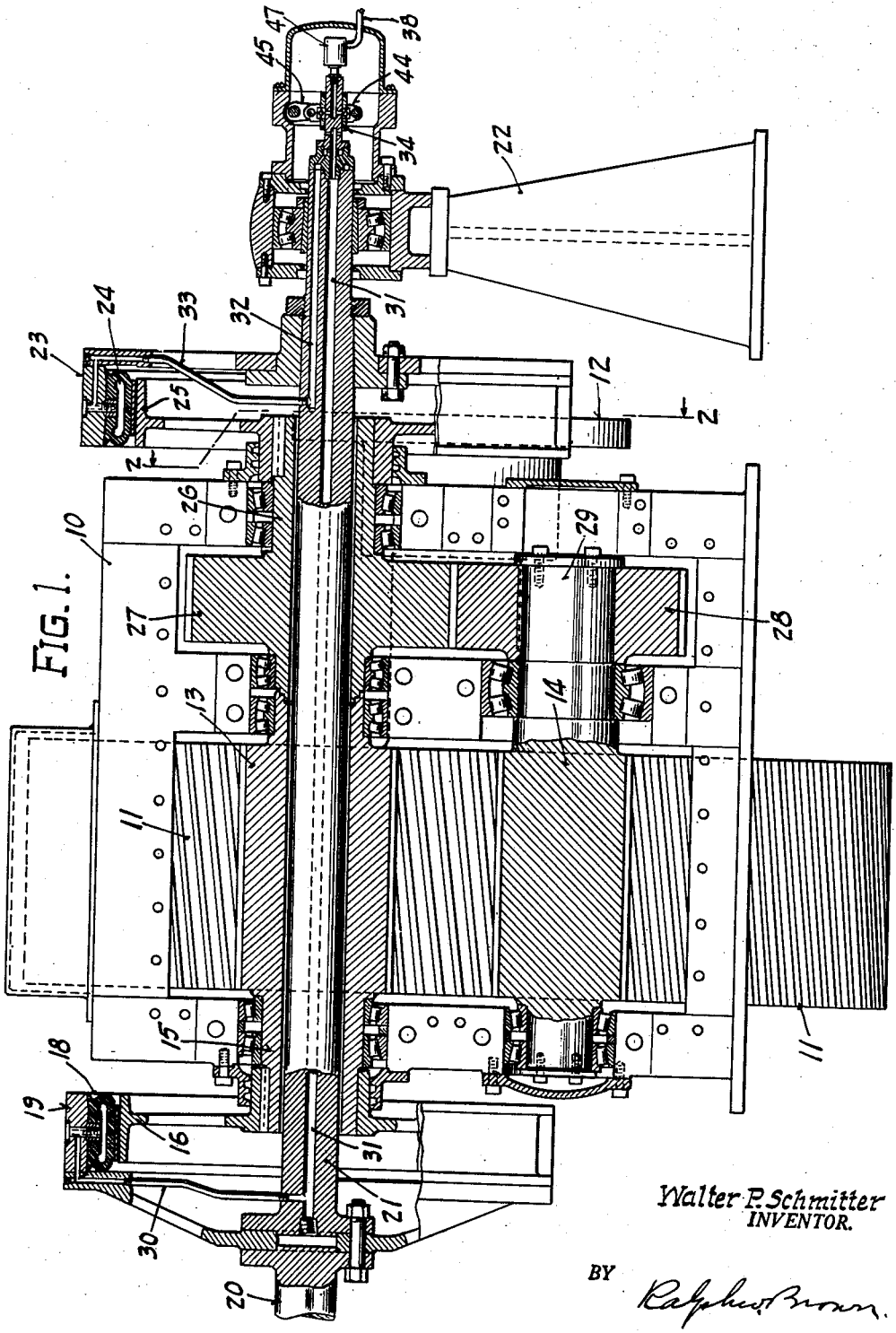
Walter P. Schmitter
INVENTOR.
BY Ralph W. Brown
ATTORNEY.

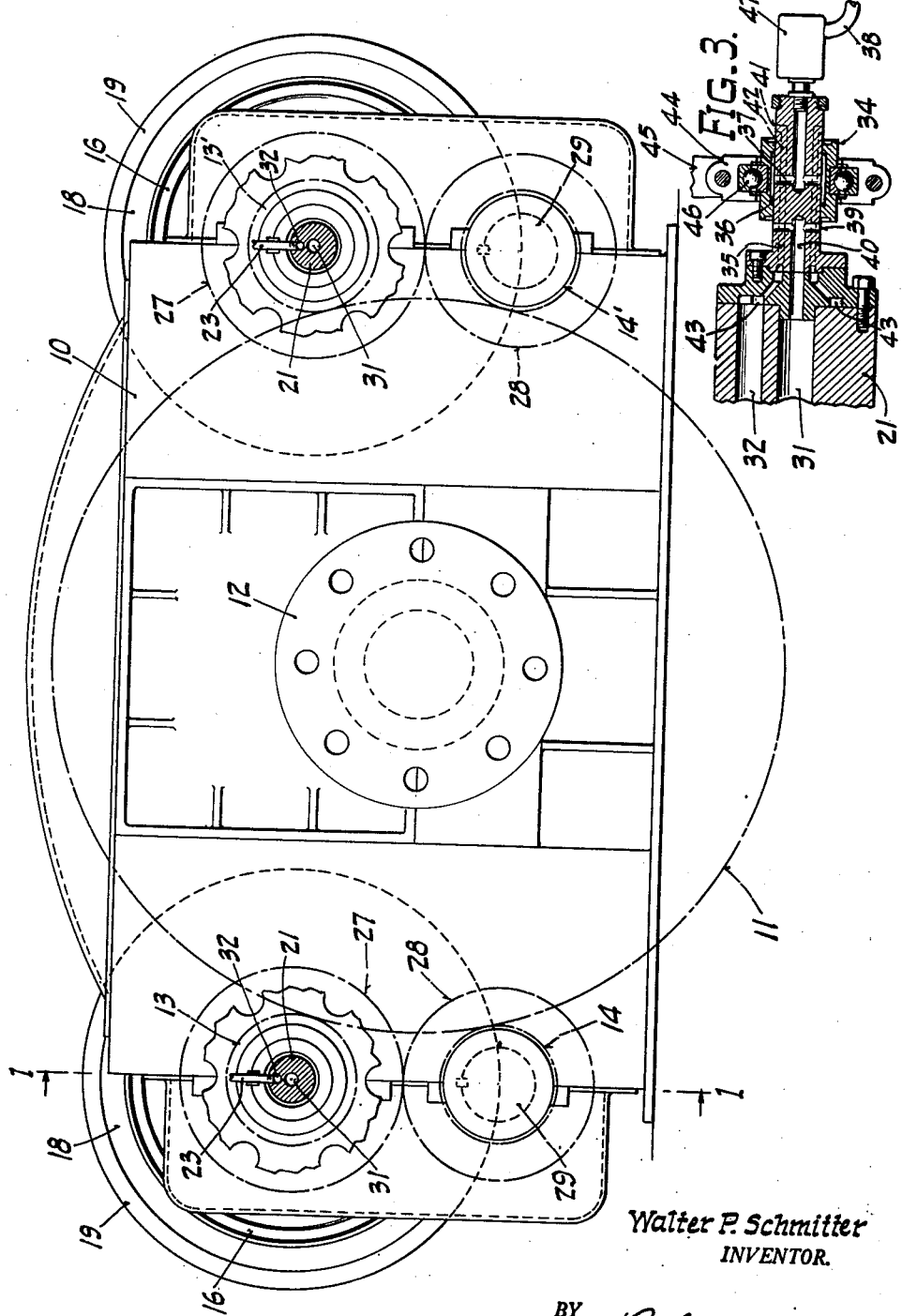

Patented July 17, 1951

2,560,990

UNITED STATES PATENT OFFICE 2,560,990

POWER TRANSMISSION

Walter P. Schmitter, Wauwatosa, Wis., assignor to The Falk Corporation, Milwaukee, Wis., a corporation of Wisconsin Application September 28, 1946, Serial No. 700,085

2 Claims. (Cl. 74—665)

This invention relates to reversible power transmissions.

One object of the present invention is to provide a simple and improved mechanism for transmitting power from a plurality of prime movers to a single driven shaft and for reversing the direction of operation of the latter.

Other more specific objects and advantages will appear, expressed or implied, from the following description of a power transmission constructed in accordance with the present invention.

In the accompanying drawings:

Figure 1 is a vertical sectional view, taken substantially along the line 1—1 of Fig. 2, of a power transmission embodying the present invention.

Fig. 2 is a sectional view taken substantially along the line 2—2 of Fig. 1.

Fig. 3 is a sectional view on a larger scale of the reversing valve shown in Fig. 1.

The power transmission mechanism selected for illustration comprises an appropriate housing 10 having a large driven gear 11 journalled therein and equipped with a suitable coupling flange 12 for connection with a propeller shaft or other mechanism to be driven. Two pairs of driving pinions 13—14 and 13'—14' are journalled in the housing and mesh with the gear 11 at opposite sides of the axis of the latter.

Each of the pinions 12 and 13' are carried by a hollow shaft 15 which extends beyond the housing 19 to provide support for the inner member 16 of a suitable clutch keyed or otherwise fixed thereto. In this instance the clutch shown is of the fluid pressure type and includes an annular fluid pressure gland 18 preferably of rubber or other flexible material carried by an outer driving ring 19 encircling the inner member 16. The clutch may be closed by expanding the gland 18 into gripping engagement with the member 16.

Each of the outer clutch rings 19 is carried by one of two drive shafts 20 and is fixed to one end of a shaft 21 that extends loosely through one of the hollow pinion shafts 15. Two shafts 21 are shown each supported independently of the housing 10 and independently of the pinion 13 or 13' through which it extends, one shaft 20 providing support for one end of each, and a suitable pedestal bearing 22 providing support for the opposite end thereof.

In this instance the transmission shown includes two additional clutches, each comprising an outer ring 23 fixed to and carried by that end of a shaft 21 opposite the clutch ring 19. Each clutch ring 23 carried a fluid pressure gland 24 which is expandable into gripping engagement with an inner clutch ring 25.

Each of the inner clutch rings 25 as fixed to and carried by the projecting end of a hollow shaft 26 loosely surrounding one of the shafts 21 and carrying a gear 27. Each of the gears 27 meshes with a gear 28 fixed to and carried by the end of a shaft 29 which carries one of the driving pinions 14 or 14'.

The arrangement is such that when both of the glands 18 are expanded into gripping engagement with the coacting clutch rings 16, both pinions 13 and 13' are thereby connected to rotate with the drive shafts 20 so as to drive the large gear 11 in one direction; and when both of the glands 24 are expanded into gripping engagement with the coacting clutch rings 25, both gears 27 are thereby connected to rotate with the drive shafts 20 so as to drive the large gear 11 in an opposite direction through the gears 28 and pinions 14 and 14'.

In this instance each of the clutch glands 18 communicates through a tube 30 with a duct 31 in the shaft 21 to which it is connected, and a second duct 32 therein communicates through a tube 33 with the other associated clutch gland 24. An appropriate valve controls the admission and exhaust of fluid pressure to the ducts 31 and 32, selectively. The valve shown for this purpose includes a cylindrical sleeve 34 closely fitted for lengthwise movement along a pintle 35 attached to the end of each shaft 21. An annular channel 36 formed in the sleeve 34 communicates through ports 37 and a duct 37' with a fluid pressure supply pipe 38. The pintle 35 is provided with a peripheral series of external ports 39 which communicate with duct 31 through a duct 40. Ports 39 are disposed at one side of the ports 37. At the other side of the ports 37 is another peripheral series of ports 41 which communicate through a series of ducts 42 and a circular channel 43 with the duct 32.

In one longitudinal position of the sleeve 34 the channel 36 therein provides communication between the ports 37 and ports 39 so as to admit fluid pressure to the duct 31 and gland 18; and in that position of the sleeve 34, the ports 41 are uncovered so that the pressure in the duct 32 and other gland 24 is released. In the opposite longitudinal position of the sleeve 34, the ports 39 are uncovered to permit release of pressure in the duct 31 and gland 18, and the other ports 41 communicate through the channel 36 with the duct 32 to supply the latter and the gland 24 with pressure.

The valve sleeve 34 may be manually controlled in various ways but in this instance it is shown mounted in an encircling two-part control ring 44 which is actuated and controlled by the forked end 45 of a suitable lever. A bearing 46 between the ring 44 and sleeve 34 permits the latter to rotate freely with the pintle 35 and shaft 21. A suitable slip joint 47 is preferably provided between the rotary pintle 35 and non-rotary supply pipe 38.

Various changes may be made in the embodiment of the invention hereinabove specifically described without departing from or sacrificing the advantages of the invention as defined in the appended claims.

I claim:

1. In a power transmission the combination of a driven gear, a plurality of pairs of driving pinions meshing with said gear, a separate driver for each of said pairs of pinions, each driver being aligned with one pinion of a pair, a shaft driven by each of said drivers and extending through the pinion with which it is aligned, a clutch at one end of each of said shafts operable to connect one of said drivers to the aligned pinion for rotation therewith to thereby effect rotation of said driven gear in one direction, a gear train connected in driving relation with the other pinion of each pair, and a clutch at the opposite end of each of said shafts operable to connect the latter in driving relation with one of said gear trains and to thereby effect operation of said driven gear in an opposite direction.

2. In a power transmission the combination of a housing, a driven gear journalled therein, two pinions journalled in said housing and meshing with said driven gear, a shaft extending loosely through one of said pinions, means beyond said housing for supporting the opposite ends of said shaft independently of said housing a gear train including a gear journalled in said housing and loosely encircling said shaft and a gear connected to rotate with the other of said pinions, and a pair of flexible clutches at opposite ends of said shaft selectively operable to connect said shaft in driving relation with one of said pinions or in driving relation with the first named gear of said gear train alternatively.

WALTER P. SCHMITTER.

REFERENCES CITED

The following references are of record in the file of this patent:

UNITED STATES PATENTS

| Number | Name | Date |
|---|---|---|
| 2,121,075 | Eason | June 21, 1938 |
| 2,304,031 | Schmitter | Dec. 1, 1942 |
| 2,311,597 | Schmitter | Feb. 16, 1943 |
| 2,335,926 | Fawick | Dec. 7, 1943 |

FOREIGN PATENTS

| Number | Country | Date |
|---|---|---|
| 204,512 | Great Britain | Jan. 16, 1923 |
| 423,850 | Germany | Jan. 10, 1926 |
| 765,471 | France | June 11, 1934 |